United States Patent
Yousef et al.

(10) Patent No.: US 12,172,112 B1
(45) Date of Patent: *Dec. 24, 2024

(54) METHOD FOR MAKING AN ADSORPTIVE AIR FILTER

(71) Applicant: IMAM MOHAMMAD IBN SAUD ISLAMIC UNIVERSITY, Riyadh (SA)

(72) Inventors: Tarek Ahmed Yousef, Riyadh (SA); Osamah Abdulrahman Aldaghri, Riyadh (SA); Saad Shaaban, Almansourah (EG)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/808,127

(22) Filed: Aug. 19, 2024

Related U.S. Application Data

(63) Continuation of application No. 18/665,929, filed on May 16, 2024, now Pat. No. 12,102,947.

(51) Int. Cl.
*B01D 39/18* (2006.01)
*B01D 39/20* (2006.01)
(Continued)

(52) U.S. Cl.
CPC ......... *B01D 39/18* (2013.01); *B01D 39/2062* (2013.01); *B01D 46/0001* (2013.01);
(Continued)

(58) Field of Classification Search
CPC  B01D 39/18; B01D 39/2062; B01D 46/0001; B01D 46/0036; B01D 46/543; B01J 20/20; B01J 20/28028; B01J 20/2803; B01J 20/3007; B01J 20/3042; B01J 20/3071; B01J 20/3078; B01J 20/3085;
(Continued)

(56) References Cited

U.S. PATENT DOCUMENTS

| | | |
|---|---|---|
| 10,906,812 B1 | 2/2021 | Salah et al. |
| 2012/0118309 A1 | 5/2012 | Taniguchi |
| 2019/0101502 A1 | 4/2019 | Aziz |

FOREIGN PATENT DOCUMENTS

| | | |
|---|---|---|
| CN | 106283828 A | 1/2017 |
| GB | 964436 | 7/1964 |

(Continued)

OTHER PUBLICATIONS

Islam et al. ; Mesoporous and adsorptive properties of palm date seed activated carbon prepared via sequential hydrothermal carbonization and sodium hydroxide activation ; Chemical Engineering Journal 270 ; Feb. 10, 2015 ; 9 Pages.

(Continued)

*Primary Examiner* — Anthony Calandra
(74) *Attorney, Agent, or Firm* — Oblon, McClelland, Maier & Neustadt, L.L.P.

(57) ABSTRACT

A biodegradable filter for the removal of various pollutants, contaminants, or harmful substances from the surrounding air, and a method of fabrication. The filter includes 30% by weight of cellulose nanofibers, 30% by weight of activated carbon, and 20% by weight of polyethylene glycol. The cellulose nanofibers and activated carbon are isolated from date palm biomass, making the filter cost-effective and environmentally friendly.

19 Claims, 1 Drawing Sheet

(51) Int. Cl.
*B01D 46/00* (2022.01)
*B01D 46/54* (2006.01)
*B01J 20/20* (2006.01)
*B01J 20/28* (2006.01)
*B01J 20/30* (2006.01)
*D21C 3/02* (2006.01)
*D21C 9/00* (2006.01)
*D21C 9/02* (2006.01)
*D21C 11/12* (2006.01)
*D21H 11/12* (2006.01)
*D21H 11/18* (2006.01)
*D21H 17/00* (2006.01)
*D21H 17/53* (2006.01)
*D21H 21/22* (2006.01)
*D21H 27/08* (2006.01)
*D21C 11/00* (2006.01)
*D21H 17/63* (2006.01)

(52) U.S. Cl.
CPC ....... *B01D 46/0036* (2013.01); *B01D 46/543* (2013.01); *B01J 20/20* (2013.01); *B01J 20/28028* (2013.01); *B01J 20/2803* (2013.01); *B01J 20/3007* (2013.01); *B01J 20/3042* (2013.01); *B01J 20/3071* (2013.01); *B01J 20/3078* (2013.01); *B01J 20/3085* (2013.01); *D21C 3/02* (2013.01); *D21C 9/001* (2013.01); *D21C 9/002* (2013.01); *D21C 9/02* (2013.01); *D21H 11/12* (2013.01); *D21H 11/18* (2013.01); *D21H 17/53* (2013.01); *D21H 17/74* (2013.01); *D21H 21/22* (2013.01); *D21H 27/08* (2013.01); *B01D 2239/025* (2013.01); *B01D 2239/0266* (2013.01); *B01D 2239/0283* (2013.01); *B01D 2239/0407* (2013.01); *B01D 2239/086* (2013.01); *B01D 2239/10* (2013.01); *B01D 2239/1291* (2013.01); *D21C 11/0007* (2013.01); *D21C 11/125* (2013.01); *D21H 17/63* (2013.01)

(58) Field of Classification Search
CPC .......... D21C 3/02; D21C 9/001; D21C 9/002; D21C 9/02; D21H 11/12; D21H 11/18; D21H 17/53; D21H 17/74; D21H 21/22; D21H 27/08
See application file for complete search history.

(56) References Cited

FOREIGN PATENT DOCUMENTS

| KR | 10-2538781 | 6/2023 |
| TN | 2018/412 | 6/2020 |
| WO | 2023244700 A1 | 12/2023 |
| WO | 2024073132 A1 | 4/2024 |

OTHER PUBLICATIONS

Raza et al.; Isolation and Characterization of Cellulose Nanocrystals from Date Palm Waste; ACS Omega, 7; 2022; 14 Pages.
English summary of CN118087302A, May 28, 2024. (Year: 2024).
Alotham et al., Cellulose nanocrystal extracted from date palm fibre: Morphological, structural and thermal properties, 2021, Industrial Crops & Products 159, p. 1-7 (Year: 2021).

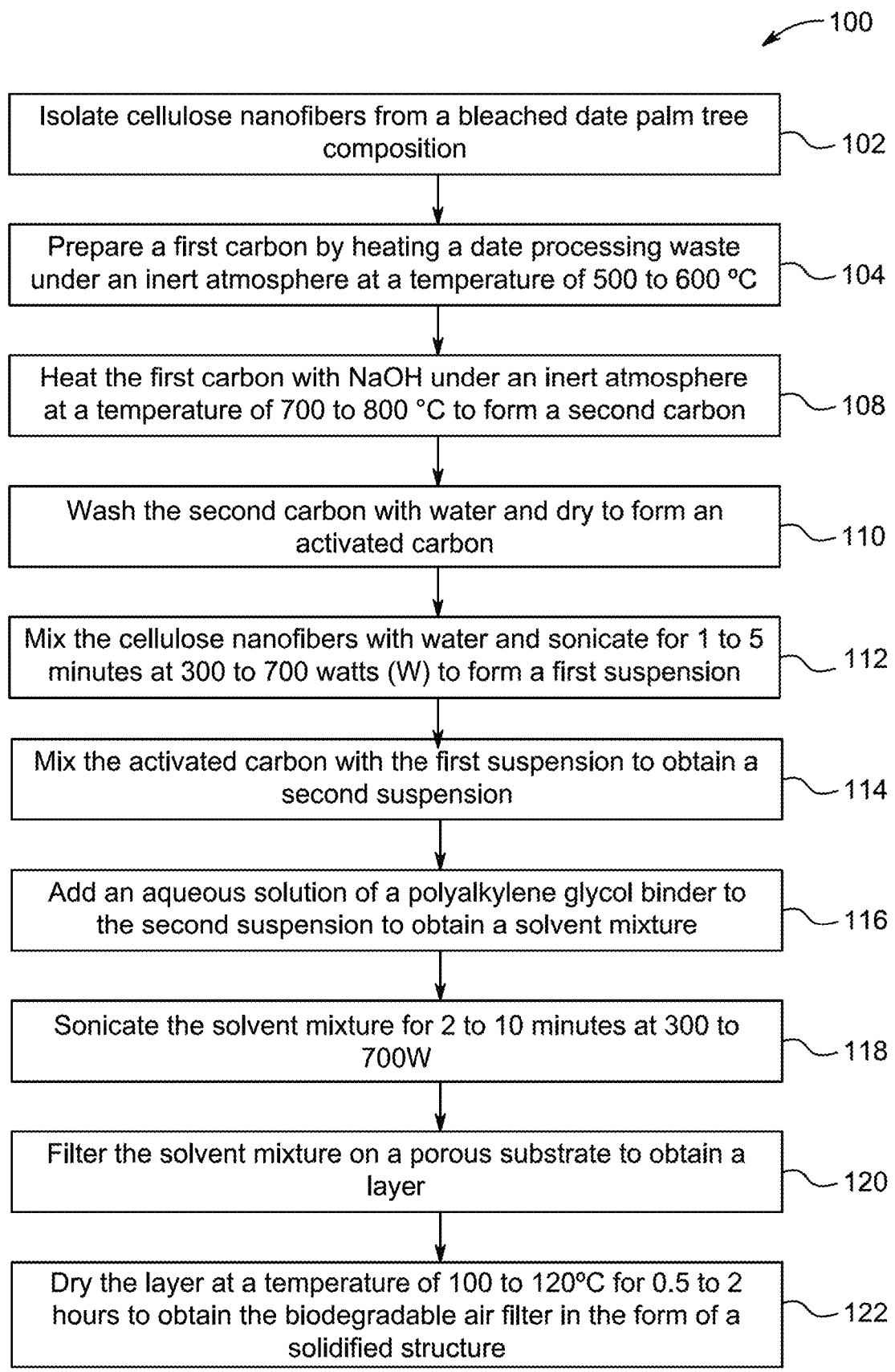

METHOD FOR MAKING AN ADSORPTIVE AIR FILTER

CROSS-REFERENCE TO RELATED APPLICATIONS

The present application is a Continuation of U.S. application Ser. No. 18/665,929, now allowed, having a filing date of May 16, 2024.

BACKGROUND

Technical Field

The present disclosure is directed to a biodegradable air filter, particularly to a bio-degradable air filter derived from date palm biomass.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Efficient ventilation systems are crucial for hospitals, schools, offices, homes, laboratories, and many other settings. Disinfecting such areas by reducing contaminants and pollutants is highly desired. Many viruses, including SARS-CoV-2 and influenza, and pathogens, like fungi and bacteria, can be transmitted through the air. Filters are commonly used in ventilation systems to limit the amount of contaminants that are circulated through the air of indoor spaces. Air filters are able to improve and maintain air quality, by capturing and retaining particles circulating in the air, stopping their further circulation in the air. Air filters typically contain a filter or a mesh comprising a mesh size that is sufficient to stop particles of pollutants, chemicals, and microorganisms from entering or circulating in the area.

Air filters can be of many types based on their structure, need, and location. Commonly used air filters are HEPA (High-Efficiency Particulate Air) and ULPA (Ultra Low Particulate Air) filters. HEPA filters are often used due to their efficiency in purifying indoor air. These filters can remove particles of size 0.3 µm or larger and trap relatively higher particles of dust, pollutants, and microbes from other types of filters. However, these filters have a high maintenance cost, and the filtering material needs to be replaced frequently, increasing their operational cost. ULPA filters are similar to HEPA filters, except, that they are able to trap smaller particles, roughly 0.1 µm in diameter or more. Another air filter that is often used is the UV air filter or purifier. These purifiers have UV lamps that emit UV light to kill the microbes and can remove many airborne pollutants also with good efficiency. UV air filters create ozone as the byproduct and can function only at specific wavelengths, making them a less preferred choice.

Ionizer-type air purifiers do not use filters, rather they purify the air based on charged ions. Such purifiers create positive or negative ions that attach to the pollutant surface and remove them from the air. This type of purifier has drawbacks, as they tend to be less effective than other air purifiers. Further, ions attached to the pollutants may deposit on various surfaces within the indoor space, stopping them from being filtered through the purifier. In addition, this type of purifier may produce ozone as a byproduct, which can have adverse effects on people's health.

Additionally, there are electronic filters that function based on frequencies of unwanted particles. These filters allow only a specific type of particle to pass through them, and the remaining pollutants are removed. Such filters function best for smoke particles, as they are too small to be captured by other kinds of filters. Some air filters have several layers of filtration material and are efficient in removing even particles that manage to penetrate through the first layer. These filters can capture larger particles than other types of filters, such as those made of fiberglass. Certain other conventionally used filters are activated carbon-based air filters with membranes made of activated carbon.

The most common structures made of carbon are carbon nanotubes, carbon fibers, activated carbon, black carbon, and diamond. Carbon-based structures are multipurpose materials, and therefore are used in various fields. For example, activated carbon may act as an absorbent and attracts pollutants, dust, and microbial particles, allowing clean air to circulate through the indoor area when used in air purification systems. Sustainability of carbon sources, however, is important and can be achieved by utilization of natural, abundant, and renewable precursors.

Dates are an important crop in many countries mainly in the Middle East. The agricultural by-product produced by the pruning of dates is considered a good source of several raw materials, such as activated carbon and cellulose nanofibers. Cellulose nanofibers have large surface area which in turn make them ideal for different applications, including air filtration. Activated carbon has a highly porous structure which in turn provide large surface area suitable for adsorption. Therefore, it may be used in air filtration to remove contaminants, odors, and pollutants from the air.

Most air filters currently used are either expensive or unsuitable for removing all kinds of contaminants and pollutants from the air. Accordingly, it is one object of the present disclosure to provide an air filter, and a method of making the air filter, capable of filtering out contaminants, including microbial particles, from the circulating air while being cost-effective and environmentally friendly.

SUMMARY

In one embodiment, a method of fabricating a biodegradable air filter is described. The method comprises isolating cellulose nanofibers from a bleached date palm tree composition obtained by treating date palm solids with a solution comprising NaOH at a temperature of 125 to 175° C.; preparing activated carbon by heating a date processing waste under an inert atmosphere at a temperature of 500 to 600° C. to obtain a first carbon, then mixing the first carbon with NaOH and heating at a temperature of 125 to 175° C.; preparing activated carbon by heating the first carbon with NaOH under an inert atmosphere at a temperature of 700 to 800° C. to obtain a second carbon, then washing the second carbon with water and drying to form the activated carbon; mixing the cellulose nanofibers with water and sonicating to form a first suspension; mixing the second carbon with the first suspension to obtain a second suspension; adding an aqueous solution of a polyalkylene glycol binder to the suspension to obtain a solvent mixture; sonicating the solvent mixture then; filtering the solvent mixture on a porous substrate to obtain a layer; and drying the layer to obtain the biodegradable air filter in the form of a solidified structure.

In some embodiments, the cellulose nanofibers and the activated carbon are obtained from an Al-Ahsa date palm.

In some embodiments, the NaOH is mixed with the first carbon in a 3:1 weight ratio.

In some embodiments, the layer is dried at a temperature of 100 to 110° C. for 0.5 to 1.5 hours.

In some embodiments, the layer is heated at 120° C. for 2 hours.

In some embodiments, the first carbon with NaOH is heated for 1 to 3 hours.

In some embodiments, the first carbon with NaOH is heated at 750° C. for 2 hours.

In some embodiments, the second carbon is dried at a temperature of 100 to 150° C. for 1 to 3 hours.

In some embodiments, the second carbon is dried at a temperature of 120° C. for 2 hours.

In some embodiments, the porous substrate is a filter paper molding or a polyester net.

In some embodiments, the solidified structure comprises a structured border comprising a plurality of sides, wherein the structured border is arranged in a closed body surrounding the biodegradable filter.

In some embodiments, the biodegradable air filter comprises 30% by weight activated carbon, 30% by weight cellulose nanofibers, and 20% by weight polyalkylene glycol binder.

In some embodiments, the solution comprises 10 to 20 wt. % NaOH.

In some embodiments, the solution comprises 15 wt. % NaOH.

In some embodiments, the method of fabricating the biodegradable air filter further comprises drying the date processing waste, wherein the date processing waste is dried at a temperature of 100 to 120° C. for 3 to 5 hours.

In some embodiments, the date processing waste is heated at a temperature of 110° C. for 4 hours.

In some embodiments, the solidified structure has a thickness of 0.5 to 5 inches.

In some embodiments, the solidified structure has a length of 5 to 35 inches.

In some embodiments, the solidified structure has a width of 5 to 35 inches.

In some embodiments, the polyalkylene glycol binder is polyethylene glycol (PEG).

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawing, wherein:

A method flowchart for fabricating a biodegradable air filter is depicted in the FIGURE.

DETAILED DESCRIPTION

In the drawings, reference numerals designate identical or corresponding parts throughout the several views. Further, as used herein, the words "a," "an" and the like generally carry a meaning of "one or more," unless stated otherwise.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, the term "biomass" refers to organic material that comes from living organisms, including plants and animals.

As used herein, the term "nanofibers" refers to fibers with diameters as small as 1 nm and can range between 1 nm and 1 μm. Nanofibers can be obtained from synthetic as well as naturally occurring polymers.

As used herein, the term "activated carbon" refers to a form of carbon obtained from carbon containing compounds that is mainly carbon content. Activated carbon may be used as an adsorbent in filters to remove undesired components from water and air.

As used herein, the term "suspension" refers to a mixture of solids in a liquid such that the solids do not dissolve but remain suspended in the liquid.

As used herein, the term "solution" refers to a mixture of two or more components wherein the mixture is homogeneous.

As used herein, the term "solvent" refers to a substance in which a solute is dissolved to form a solution.

As used herein, the term "adsorption" refers to the attachment of molecules, ions, or atoms to a solid surface.

As used herein, the term "filter" refers to a device that allows only selective substances, particles, or molecules to pass through it.

As used herein, the term "biodegradable" refers to the decomposition of an organic material by living organisms such as microorganisms.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

Aspects of the present disclosure are directed to an air filter and, more particularly, to a method of fabrication of an air filter from date palm biomass. Date palm biomass is a readily available organic source having remarkable physicochemical properties. This biomass is a rich source of cellulose fibers and activated carbon. The present invention employs the characteristics of date palms in producing an air filter that is sustainable, cost-effective, and biodegradable. Further, biomass from any date palm tree can be used in the present method. However, biomass from date palm trees grown in the Al-Ahsa region is preferred.

Disclosed herein is a method of fabricating an air filter from cellulose, activated carbon, and a polymer wherein cellulose and activated carbon are derived from date palm. The cellulose and activated carbon herein act as the adsorbents to remove unwanted substances from the surrounding air and are efficient in removing all kinds of pollutants, such as harmful and toxic particles, including those of smoke. The polymer acts as a binder and may be a polyalkylene glycol.

In an embodiment, the air filter comprises 25 to 35% by weight cellulose fibers, preferably 26 to 34% by weight cellulose fibers, preferably 27 to 33% by weight cellulose fibers, preferably 28 to 32% by weight cellulose fibers, preferably 29 to 31% by weight cellulose fibers; 25 to 35% by weight activated carbon, preferably 26 to 34% by weight activated carbon, preferably 27 to 33% by weight activated carbon, preferably 28 to 32% by weight activated carbon, preferably 29 to 31% by weight activated carbon; 15 to 25% by weight polyalkylene glycol, preferably 16 to 24% by weight polyalkylene glycol, 17 to 23% by weight polyalkylene glycol, 18 to 22% by weight polyalkylene glycol, 19 to 21% by weight polyalkylene glycol. In a specific embodiment, the air filter comprises 30% by weight cellulose fibers, 30% by weight activated carbon, and 20% by weight polyalkylene glycol.

A FIGURE depicting a method 100 of fabricating a biodegradable air filter is described. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

The present invention discloses a method of isolating cellulose nanofibers and activated carbon from date palms. According to the embodiments herein, the filter offers several advantages, such as biodegradability, sustainability, availability, and cost-effectiveness, which distinguish it from the existing ones. Most importantly, the biodegradability of these filters makes it possible to easily decompose or fabricate them from a sustainable or non-exhausting organic source.

At step 102, the method 100 comprises isolating cellulose nanofibers from a bleached date palm tree composition. Date palm solids are treated with a solution comprising sodium hydroxide (NaOH) that is prepared by dissolving sodium hydroxide in water. The water may be tap water, distilled water, deionized water, deionized distilled water, reverse osmosis water, and/or some other water. In one embodiment, the solution comprises 10 to 20 wt. % NaOH, preferably 11 to 19 wt. % NaOH, preferably 12 to 18 wt. % NaOH, preferably 13 to 17 wt. % NaOH, preferably 14 to 16 wt. % NaOH, preferably 15 wt. % NaOH.

The date palm solids are treated with NaOH solution at a temperature of 125 to 175° C., preferably at a temperature of 128 to 172° C., preferably at a temperature of 131 to 169° C., preferably at a temperature of 134 to 166° C., preferably at a temperature of 137 to 163° C., preferably at a temperature of 140 to 160° C., preferably at a temperature of 143 to 157° C., preferably at a temperature of 146 to 154° C., preferably at a temperature of 149 to 151° C., preferably at a temperature of 150° C.

The treatment of date palm solids with NaOH produces cellulose nanofibers which are treated with a bleaching agent. Treatment of date palm solids with a bleaching agent helps in the removal of colored compounds such as lignin from the palm solids. The bleaching agent breaks the water-insoluble bonds of these compounds for their easy removal, resulting in high-quality fibers. Suitable bleaching agents include sodium hypochlorite, acetic acid, sulphuric acid, and the like. In one embodiment, the bleaching agent is sodium hypochlorite.

Cellulose fibers are environmentally friendly, due to their ability to naturally decompose. Cellulose fibers degrade without producing toxic substances, thus decreasing the impact degradation of this carbon source has on the environment. Cellulose fibers have a relatively larger surface area which makes them ideal for air filtration as they can adsorb higher amounts of contaminants in less amount of time. Further, because they are nanofibers, when used as an unoriented fiber mass the resulting pore structure allows for absorption of finer particles, such as those of smoke, dust, and other pollutants having small particle sizes.

At step 104, the method 100 comprises preparing a first carbon by heating a date processing waste. Date processing waste is a biomass waste produced from the processing of date fruits and is usually used as animal feed or thrown away in large quantities. The present invention provides a method of utilizing this waste for producing activated carbon, making this method cost effective. Date waste can be obtained from any date processing industry where date fruit processing takes place. In some embodiments, the date processing waste comprises date palm skins, leading to increased flexibility and elasticity of the filter. In some embodiments, the date processing waste is dried at a temperature of 100 to 120° C., preferably at 102 to 118° C., preferably at 104 to 116° C., preferably at 106 to 114° C., preferably at 108 to 112° C., preferably at 110° C. In one embodiment, the date processing waste is dried for a period of 3 to 5 hours, preferably 3.5 to 4.5 hours. In a preferred embodiment, the date processing waste is dried at a temperature of 110° C. for a period of 4 hours.

Once dried, the date processing waste is subjected to heat treatment under an inert atmosphere. Maintaining an inert atmosphere allows for the gaseous products to escape while the date processing waste is heated. Adding an inert gas also limits undesirable interactions between the substances. The dried date processing waste is transferred to an electrical furnace or oven, and an inert gas is passed through the furnace or oven while the date processing waste is heated at temperatures of 500 to 600° C. In a specific embodiment, the inert gas is nitrogen. In some embodiments, the dried date processing waste is heated at temperatures of 502 to 598° C., preferably at temperatures of 504 to 596° C., preferably at temperatures of 506 to 594° C., preferably at temperatures of 508 to 592° C., preferably at temperatures of 510 to 590° C., preferably at temperatures of 512 to 588° C., preferably at temperatures of 514 to 586° C., preferably at temperatures of 516 to 584° C., preferably at temperatures of 518 to 582° C., preferably at temperatures of 520 to 580° C., preferably at temperatures of 522 to 578° C., preferably at temperatures of 524 to 576° C., preferably at temperatures of 526 to 574° C., preferably at temperatures of 528 to 572° C., preferably at temperatures of 530 to 570° C., preferably at temperatures of 532 to 568° C., preferably at temperatures of 534 to 566° C., preferably at temperatures of 536 to 564° C., preferably at temperatures of 538 to 562° C., preferably at temperatures of 540 to 560° C., preferably at temperatures of 542 to 558° C., preferably at temperatures of 544 to 556° C., preferably at temperatures of 546 to 554° C., preferably at temperatures of 548 to 552° C., preferably at temperatures of 550° C. In another embodiment, the dried date processing waste is heated at a temperature of 550° C. for a period of 1 to 4 hours, preferably for a period of 2 to 3 hours. In a specific embodiment, the dried date processing waste is heated at a temperature of 550° C. for a period of 2 hours. The heat treatment of dried date processing waste produces a first carbon.

At step 108, the method 100 comprises heating the first carbon with NaOH under an inert atmosphere at a temperature of 700 to 800° C. to obtain a second carbon. The mixture of first carbon and NaOH is heated under an inert atmosphere at temperatures of 700 to 800° C., preferably at temperatures of 705 to 795° C., preferably at temperatures of 710 to 790° C., preferably at temperatures of 715 to 785° C., preferably at temperatures of 720 to 780° C., preferably at temperatures of 725 to 775° C., preferably at temperatures of 730 to 770° C., preferably at temperatures of 735 to 765° C., preferably at temperatures of 740 to 760° C., preferably at temperatures of 745 to 755° C. In a preferred embodiment, the mixture of first carbon and NaOH is heated under an inert atmosphere at temperatures of 750° C. In some embodiments, the mixture of first carbon and NaOH is heated under an inert atmosphere at temperatures of 700 to 800° C. for a period of 1 to 3 hours. In certain embodiments, the mixture of first carbon and NaOH is heated under an inert atmosphere at temperatures of 700 to 800° C. for a period of 2 to 3 hours. In some embodiments, the mixture of first carbon and NaOH is heated under an inert atmosphere at temperatures of 700 to 800° C. for a period of 3 hours. In specific embodiments, the mixture of first carbon and NaOH is heated under an inert atmosphere at temperatures of 700 to 800° C. for a period of 2 hours. The heating of the first carbon with NaOH under an inert atmosphere produces a second carbon. The NaOH is added to the first carbon in a weight ratio of 1:1 to 5:1, preferably 2:1 to 4:1, preferably 3:1.

At step 110, the method 100 comprises washing the second carbon with water and drying to form an activated carbon. The second carbon is washed with water to remove NaOH from the carbon, thus obtained. The water can be distilled water or tap water. In some embodiments, the water is distilled water. The second carbon is washed with water 2 or more times so that the NaOH is removed completely from the carbon. The pH of the carbon material can be tested to confirm the removal of the entire NaOH residue from the second carbon material. Washing of the second carbon is followed by subjecting the second carbon to heat for drying, wherein the second carbon is heated at temperatures of 100 to 150° C. for a period of 1 to 3 hours. In one embodiment, the second carbon is heated at temperatures of 102° C., preferably at temperatures of 104° C., preferably at temperatures of 106° C., preferably at temperatures of 108° C., preferably at temperatures of 110° C., preferably at temperatures of 112° C., preferably at temperatures of 114° C., preferably at temperatures of 116° C., preferably at temperatures of 118° C., preferably at temperatures of 120° C., preferably at temperatures of 122° C., preferably at temperatures of 124° C., preferably at temperatures of 126° C., preferably at temperatures of 128° C., preferably at temperatures of 130° C., preferably at temperatures of 132° C., preferably at temperatures of 134° C., preferably at temperatures of 136° C., preferably at temperatures of 138° C., preferably at temperatures of 140° C., preferably at temperatures of 142° C., preferably at temperatures of 144° C., preferably at temperatures of 146° C., preferably at temperatures of 148° C., preferably at temperatures of 150° C. In some embodiments, the second carbon is heated at temperatures of 120° C. In certain embodiments, the second carbon is heated for a period of 3 hours to obtain the dried carbon. In some embodiments, the second carbon is heated for a period of 2 hours to obtain the dried carbon.

The dried second carbon is activated carbon, which is required for preparing the air filter. The activated carbon is kept under nitrogen for further use. The activated carbon obtained by this method has a highly porous structure that provides a large surface area for adsorption. A combination of activated carbon with cellulose nanofibers makes a remarkable filtration material that can remove various kinds of pollutants, contaminants, and odors from the air.

At step 112, the method 100 comprises mixing cellulose nanofibers with water to form a first suspension. The cellulose nanofibers are dispersed in water wherein the water may be distilled water or deionized water. In one embodiment, the cellulose nanofibers are dispersed in distilled water. In a preferred embodiment, the cellulose nanofibers are dispersed in deionized water. In one embodiment, 25 to 35% by weight of cellulose nanofibers are dispersed in water, preferably 24 to 34%, preferably 26 to 33%, preferably 27 to 32%, preferably 28 to 31%. In certain embodiments, 30% by weight of cellulose nanofibers are dispersed in water. After dispersion, the cellulose nanofibers are sonicated for a period of 2 to 10 minutes, preferably for a period of 3 to 9 minutes, preferably for a period of 4 to 8 minutes, preferably for a period of 5 to 7 minutes. In a specific embodiment, the cellulose nanofibers are sonicated for a period of 5 minutes. Sonication may be performed with a sonicator probe at a power of 300 to 700 watts (W), preferably 400 to 600 W, more preferably 500 W.

At step 114, the method 100 comprises mixing the activated carbon with the first suspension to obtain a second suspension. The method comprises addition of the activated carbon to the first suspension. In some embodiments, 25 to 35% by weight of activated carbon is added to the first suspension preferably 26 to 34%, preferably 27 to 33%, preferably 28 to 32%, preferably 29 to 31%. In another embodiment, 30% by weight of activated carbon is added to the first suspension. The activated carbon and the first suspension are mixed thoroughly to form a second suspension.

At step 116, the method 100 comprises adding an aqueous solution of a polyalkylene glycol binder to the second suspension to obtain a solvent mixture. The method comprises dissolving a polymer in water, wherein the polymer may be a polyalkylene glycol. In one embodiment, the polyalkylene glycol is a water-soluble polyalkylene glycol. Suitable examples of a polyalkylene glycol that can be used include polyethylene glycol and polypropylene glycol. In a preferred embodiment, the polyalkylene glycol is polyethylene glycol. The polyalkylene glycol herein serves as a binder for the components of the air filter, which enhances the overall structural integrity and stability of the air filter.

In some embodiments, 15 to 25% by weight of the polyalkylene glycol is dissolved in water, preferably 16 to 24%, preferably 17 to 23%, preferably 18 to 22%, preferably 19 to 21%. In certain embodiments, about 20% by weight of the polyalkylene glycol is dissolved in water. In one embodiment, the water is deionized water. Deionized water is preferred as deionizing removes all ions and unwanted particles from the water which further eliminates the possibility of interaction between the ions and other dissolved particles in water. The solution of polyalkylene glycol is added to the second suspension to form a solvent mixture.

At step 118, the method 100 comprises sonicating the solvent mixture for 2 to 5 minutes. In one embodiment, the solvent mixture is sonicated for 3 to 5 minutes. In a preferred embodiment, the solvent mixture is sonicated for 3 minutes. Sonication may be performed with a sonicator probe at a power of 300 to 700 watts (W), preferably 400 to 600 W, more preferably 500 W. In another embodiment, the solvent mixture is sonicated continuously in a reservoir at a power of 100 to 500 W, more preferably 200 to 400 W. In a preferable embodiment, the reservoir is a shallow reservoir connected to a downward track.

At step 120, the method 100 comprises filtering the solvent mixture on a porous substrate to obtain a layer. The porous substrate may be made of a material selected from paper, a mesh material, cardboard, wood, and the like. In a preferred embodiment, the porous substrate may be made of paper. In one embodiment, the porous substrate may be made of filter paper, preferably hardened filter paper. In a preferred embodiment, the porous substrate may be a molding made of filter paper. In another embodiment, the porous substrate may be a mesh material. In another embodiment, when the porous substrate is a mesh material, a polyester net may be preferred. In yet another embodiment, the porous substrate may be in the form of an elongated sheet. In one embodiment, the elongated sheet may be placed on a linear travel path that moves in a forward direction into an oven or a furnace for drying of the layer. In another embodiment, the solvent mixture, while being continuously sonicated, travels along the downward track into the porous substrate on the linear travel path. In one embodiment, the solvent mixture is left to saturate the porous substrate to form the layer.

In a preferred embodiment, the solvent mixture is cast onto a porous membrane or porous fibrous mass. The porous membrane has a membrane porosity sufficient to capture the activated carbon and nano cellulose mass present in the solvent mixture. The porous membrane is not used to separate or selectively entrap the solids of the solvent mixture but is instead used as a basis for forming a backing layer for the biodegradable filter, e.g., a bottom layer on which a top layer comprising the cellulose nanofiber, activated carbon and solvent is present. In order to provide improved adhesion between the substrate (porous membrane) and the top layer formed on the surface of the porous membrane after drying, the backside of the substrate (i.e., the side opposite the side on which the solvent mixture is cast) is preferably provided with a regular pattern of concave indentations having apexes that open to the top surface of the porous membrane. The solvent mixture passes through the vacant apexes of the concaves at the top surface of the porous membrane and fills the concave voids. Upon drying the dried material is continuous from the outer most surface of the dried cast solvent mixture through the porous membrane and into the concave space. In this manner the dried material in the concave spaces provides a means to better adhere the dried layer to the substrate while maintaining flexibility and pliability in the filter. The concave spaces are regularly spaced at a distance of from 0.1 to 5 mm, preferably 0.5 to 2.5 mm, or 1 to 2 mm. The concaves preferably have bases open to a bottom surface of the porous membrane having a width of from 0.05 to 1 mm, preferably 0.1 to 0.5 mm or about 0.25 mm. Openings formed at the top surface of the porous membrane at the apexes of concaves preferably have a width of 1 to 10% of the width of the base, preferably 3 to 7% or about 5% of the width of the base of the concaves.

At step 122, method 100 comprises drying the layer of the solvent mixture to obtain the air filter in the form of a solidified structure. The layer of solvent mixture is dried by heating at temperatures between 100 to 110° C. for a period of 0.5 to 1.5 hours. In some embodiments, the layer of solvent mixture is heated at 101° C., preferably at 102° C., preferably at 103° C., preferably at 104° C., preferably at 105° C., preferably at 106° C., preferably at 107° C., preferably at 108° C., preferably at 109° C., preferably at 110° C. In certain embodiments, the layer of solvent mixture is heated for a period of 0.5 hours, preferably for a period of 0.6 hours, preferably for a period of 0.7 hours, preferably for a period of 0.8 hours, preferably for a period of 0.9 hours, preferably for a period of 1.0 hours, preferably for a period of 1.1 hours, preferably for a period of 1.2 hours, preferably for a period of 1.3 hours, preferably for a period of 1.4 hours, preferably for a period of 1.5 hours. The drying can be done by using heating appliances such as ovens, microwaves, autoclaves, hot plates, heating mantles and tapes, oil baths, salt baths, sand baths, air baths, hot-tube furnaces, and hot-air guns. In a preferred embodiment, the layer of solvent mixture is dried by heating an oven at 108° C. for a period of 0.75 hours to obtain a solidified structure. In another embodiment, the layer is carried down the linear travel path into an oven or furnace to dry the layer. In another embodiment, after the layer has dried to form a solidified structure, the structure continues down the linear travel path. In one embodiment, the layer is rolled into a cylindrical form to be placed into the solidified structure at a later date. In one embodiment, the solidified structure may be cut according to a specified length once out of the oven.

The layer of solidified structure can be further dried if moisture is still present in the layer. In such cases, the layer can be dried at a controlled temperature and humidity level.

The solidified structure is the air filter comprising a defined border with a definite shape and a plurality of sides. The border is structured and arranged in a closed body surrounding the sides of the structure. The solidified structure can be given any shape as desired, including but not limited to square, rectangular, and circular. Further, the shape of the solidified structure can be designed based on the length, width, and thickness of the structure. In one embodiment, the length of the solidified structure is 5 to 35 inches, preferably 7 to 33 inches, preferably 9 to 31 inches, preferably 11 to 29 inches, preferably 13 to 27 inches, preferably 15 to 25 inches, preferably 17 to 23 inches, preferably 19 to 21 inches.

In another embodiment, the width of the solidified structure is 5 to 35 inches, preferably 8 to 32 inches, preferably 11 to 29 inches, preferably 14 to 26 inches, preferably 17 to 23 inches. In some embodiments, the thickness of the solidified structure is 0.5 to 5 inches, preferably 1.0 to 4.5 inches, preferably 1.5 to 4 inches, preferably 2 to 3.5 inches, preferably 2.5 to 3 inches.

The fabricated air filter of the present invention is dedicated to removing airborne pollutants, such as dust particles, allergens, and potentially harmful chemicals of all kinds, from the surrounding air. Hence, these filters are not limited by the type of pollutant or contaminant to be removed. Further, these filters can be molded in any shape and installed in any closed area or space that requires the circulation of purified air. The filters herein can also be fitted into ventilation systems, centralized air conditioning systems, or any other system designed to provide a continuous supply of air to a specified area.

Numerous modifications and variations of the present disclosure are possible in light of the above teachings. It is therefore to be understood that within the scope of the appended claims, the invention may be practiced otherwise than as specifically described herein.

The invention claimed is:

1. A method for making a biodegradable air filter, comprising:
   isolating cellulose nanofibers from a bleached date palm tree composition obtained by treating date palm solids with a solution comprising NaOH at a temperature of 125 to 175° C.;
   preparing a first carbon by heating a date processing waste under an inert atmosphere at a temperature of 500 to 600° C.;

heating the first carbon with NaOH under an inert atmosphere at a temperature of 700 to 800° C. to form a second carbon;

washing the second carbon with water and drying to form an activated carbon;

mixing the cellulose nanofibers with water and sonicating for 1 to 5 minutes at 300 to 700 watts (W) to form a first suspension;

mixing the activated carbon with the first suspension to obtain a second suspension;

adding an aqueous solution of a polyalkylene glycol binder to the second suspension to obtain a solvent mixture;

sonicating the solvent mixture for 2 to 10 minutes at 300 to 700 W;

filtering the solvent mixture on a porous substrate to obtain a layer; and drying the layer at a temperature of 100 to 120° C. for 0.5 to 2 hours to obtain the biodegradable air filter in the form of a solidified structure containing unoriented cellulose nanofibers.

2. The method of claim 1, wherein the porous substrate is a porous membrane having a top surface and a bottom surface, wherein a plurality of regularly spaced concaves are present in the porous membrane such that the apexes of the concaves open to the top surface and the bases of the concaves are open to the bottom surface of the porous membrane;

wherein during the filtering the solvent mixture passes through apexes and fills the concaves; and cellulose nanofibers and the activated carbon are obtained from an Al-Ahsa date palm.

3. The method of claim 1, wherein the NaOH and the first carbon are in a 3:1 weight ratio during the heating.

4. The method of claim 1, wherein the layer is dried at a temperature of 108° C. for 0.75 hours.

5. The method of claim 1, wherein the solvent mixture is sonicated for 3 minutes.

6. The method of claim 1, wherein the first carbon with NaOH is heated for 1 to 3 hours.

7. The method of claim 1, wherein the first carbon with NaOH is heated at 750° C. for 2 hours.

8. The method of claim 1, wherein the second carbon is dried at a temperature of 100 to 150° C. for 1 to 3 hours.

9. The method of claim 1, wherein the porous substrate is a filter paper molding or a polyester net.

10. The method of claim 1, wherein the solidified structure comprises:

a structured border having a plurality of sides, wherein the structured border is arranged in a closed body surrounding the biodegradable filter.

11. The method of claim 1, wherein the biodegradable air filter comprises:

20 to 40% by weight activated carbon;

20 to 40% by weight cellulose nanofibers; and 10 to 30% by weight polyalkylene glycol binder.

12. The method of claim 1, wherein the solution comprises 10 to 20 wt. % NaOH.

13. The method of claim 1, wherein the solution comprises 15 wt. % NaOH.

14. The method of claim 1, further comprising:

drying the date processing waste, wherein the date processing waste is dried at a temperature of 100 to 120° C. for 3 to 5 hours.

15. The method of claim 1, wherein the solidified structure has a thickness of 0.5 to 5 inches.

16. The method of claim 1, wherein the solidified structure has a length of 5 to 35 inches.

17. The method of claim 1, wherein the solidified structure has a width of 5 to 35 inches.

18. The method of claim 1, wherein the polyalkylene glycol binder is polyethylene glycol (PEG).

19. The method of claim 1, wherein the date palm processing waste is date palm skin.

* * * * *